Patented Aug. 7, 1951

2,563,640

UNITED STATES PATENT OFFICE 2,563,640

CHEMICAL AFTERTREATMENT OF HIGH POLYMERS CONTAINING CYANO GROUPS USING AMMONIA AND A HYDROSULFIDE

Robert Lowry Brown, Wilmington, Del., assignor to E. I. du Pont de Nemours & Company, Wilmington, Del., a corporation of Delaware No Drawing. Application May 2, 1947, Serial No. 745,633

9 Claims. (Cl. 260—79.5)

This invention relates to the chemical modification of structures prepared from synthetic polymers and particularly to the treatment of structures prepared from polymers containing nitrile groups. By "structures" is meant any form of the polymer, for example, yarns, threads, fabrics, films or the like.

It is well known that the physical and chemical properties of polymers may be materially and advantageously modified by cross-linking and vulcanizing techniques. One example is the preparation of rubber-like compounds from polyvinyl alcohol or its esters by heating the polymeric materials in the presence of sulfur or sulfur compounds. Such processes, however, do not disclose satisfactory means for after-treating formed structures of nitrile-containing polymers by modification of or reactions involving the nitrile groups. Fibers and films prepared from high molecular weight vinyl polymers containing a nitrile group, which in the monomer is adjacent to the vinyl linkage, are not unusually heat stable. Such materials generally lose strength rapidly when exposed for long periods of time to heat, for example, at temperatures varying from 150° C. to 250° C. Furthermore, if the materials are under tension during the exposure, excessive elongation or creep occurs. Fabrics prepared from vinyl polymers containing such nitrile groups, for example, polyacrylonitrile or similar polymers, have good dielectric properties and also a general inertness to moisture, fungus, oils and common organic solvents. Furthermore, they have excellent electrical resistivity and inertness to chemicals. However, their relatively low heat distortion temperatures preclude their extensive use in such applications as electrical laminations, electrical insulation, high temperature filtrations, high speed power and conveyor belts, and other uses in which the articles are exposed to considerable heat. Since the materials prepared from nitrile-containing vinyl polymers, such as polyacrylonitrile, have excellent dielectric properties as well as general stability, a solution to the problem of thermal instability is desirable.

An object of this invention is the provision of a method for improving certain physical properties of fabrics and the like of nitrile containing polymers. A further object is the provision of such polymeric structures having improved heat stability. A still further object is the provision of a method for raising the melting point of low melting, easily spinnable polymers which contain nitrile groups with the production of materials having improved dimensional stability at elevated temperatures and which retain the excellent dielectric properties of the original structures, such as yarns, fabrics or the like. Other objects will appear hereinafter.

The objects of this invention can be obtained through controlled chemical treatments of fabrics, yarns or the like prepared from polymers containing a plurality of nitrile groups attached to the polymer chain, as, for example, polymers resulting upon the polymerization, copolymerization or interpolymerization of vinyl compounds having a nitrile group adjacent to the vinyl linkage. The preferred method of achieving the purposes of this invention is to heat the polymeric structure, for example, the fabric, yarn or the like, in a medium containing ammonia and a hydrosulfide or their equivalent, an example being ammonium hydrosulfide. The treatment may be carried out at a temperature of about 100° C. for about two hours, these values being varied according to the exact properties desired in the final products. The following examples in Tables I and II are given by way of illustration and are not to be considered limitative.

The zero strength temperature (Z. S. T.) referred to is that temperature at which a yarn or similar structure breaks under a load of 0.5 gram per denier when in contact with a heated metal surface. The creep value is elongation expressed in per cent that occurs in fifteen minutes when the yarn or similar structure is heated at a temperature of 100° C. and is placed under a load of 1 gram per denier. Upon release of this load, the structure tends to return to its original size and the recovery value represents the percentage of creep elongation recovered in fifteen minutes at 100° C. after release of the load. Solubility tests were run using acetone, dimethyl formamide (DMF) and other solvents.

In the following chemical after-treatments, the material being tested was used in skein form (50 yards) and was placed in a glass tube with 50 milliliters of the particular agent employed. The glass tube was then sealed and the contents were heated at the temperatures and for the times indicated. A control experiment was run as given below. All the yarns or films became a bright yellow to orange color, the shade of which varied with the material involved.

still being under tension on the mandrel. This yarn is designated as yarn B.

*Table I*

| Example | Composition | Treatment | Time (hrs.) | Temp. (° C.) | Creep (Per Cent) | Z. S. T. (° C.) | Dry Tenacity, g./d. | Solubility in DMF |
|---|---|---|---|---|---|---|---|---|
| 1 (Control) | Polyacrylonitrile | Untreated | | | 22.0 | 147 | 4.4 | Sol. |
| 2 | do | 0.5 M [1] NH₄SH | 1 | 100 | 7.0 | 299 | 4.0 | Insol. |
| 3 | do | 0.5 M NH₄SH | 13 min. | 150 | 6.9 | 316 | 4.1 | Do. |
| 4 | do.[2] | "NH₄S₂H" (0.5 M NH₄SH with 0.5 mole dissolved elementary sulfur per liter). | 0.5 | 100 | | 312 | 4.3 | Do. |
| 5 | do.[2] | ethanol saturated with NH₃ and H₂S. | 2 | 100 | 6.1 | 330 | | Do. |
| 6 | do.[2] | 0.5 M ethanedithiol in ethanol, NH₃ saturated. | 2 | 100 | 11.9 | 253 | | Do. |
| 7 | Acrylonitrile/methyl vinyl ketone interpolymer (90:10).[2] | 0.5 M NH₄SH | 0.5 | 100 | 11.0 | 290 | 3.1 | Do. |
| 8 | Acrylonitrile/styrene (90:10). | do | 0.5 | 100 | 10.2 | 303 | 3.4 | Do. |
| 9 | polymethacrylonitrile | do | 1 | 100 | | [3]283 | | Acetone insol. (Control sol.). |

[1] Molarities are based on the percentage hydrogen sulfide in the solution.
[2] Treated yarn was heated in air at 125° C. for 2 hours.
[3] Control 135.

From the above results, it can be seen that treatment according to this invention results in a marked increase in distortion temperatures and in improved thermal stability. For example, the yarns of polyacrylonitrile which were untreated have a zero strength temperature of only 147° C. whereas those treated as described above have zero strength temperatures of 316° C. or higher. Furthermore, the creep values are materially reduced, going from 22% for the control to as low as about 6% for some of the modified materials of this invention. Further, it is noted that the strength of the materials, as measured for example by tenacity, has not been disadvantageously affected and that the chemical properties, such as solvent resistance have been materially improved. The structures have, by the process of this invention, been converted from acetone- and dimethylformamide-solution products to products which are insoluble in such solvents.

It is possible to obtain even better thermal stability or lower creep values by carrying out the treatments with ammonium hydrosulfide on structures which are under tension. This is shown in the following experiments which are summarized in Table II below.

A 50 yard portion of a fiber prepared from polyacrylonitrile was placed in a glass tube containing 50 milliliters of 0.5 M ammonium hydrosulfide. The fiber was under no tension. The tube was then sealed and heated for one hour at a temperature of 100° C., after which treatment the yarn was removed, washed and then heat-treated at 150° C. for one hour while in skein form. This yarn is designated as yarn A.

Another 50 yard skein of polyacrylonitrile fiber was taken from the same batch. This was wound on an aluminum mandrel under tension so that no shrinkage could occur during treatment. This was also treated in 0.5 M ammonium hydrosulfide for one hour at 100° C. substantially in the manner described above. After this treatment, the yarn was removed from the reagent, washed and heat-treated for one hour at 150° C., the yarn The properties of yarn A and yarn B are as follows:

*Table II*

| Example | Creep (per cent) | Recovery (per cent) | Z. S. T. (°C.) | Dry tenacity (grams per denier) |
|---|---|---|---|---|
| A | 7.0 | 55.7 | 299 | 4.0 |
| B | 2.7 | 91.0 | 308 | 5.5 |

From the figures above, it can be readily seen that while the zero strength temperatures have not been greatly improved, the creep values have been materially reduced. The yarn treated while under tension had a creep value of only 2.7% as compared to a value of 7.0% for the control (yarn A) and recovered to a much greater extent (91%) than did the control yarn (55.7%). Further, the yarn treated under tension had an increased dry tenacity (5.5 grams per denier), being materially higher than that of the untreated yarn (4.0 grams per denier).

From the above description and examples, it can be seen that the process of this invention is applicable in general to high polymers containing nitrile groups. The examples have been shown the application of this invention to materials prepared from polymers obtained by polymerizing vinyl compounds which bear a nitrile group on one of the ethylene carbons. These polymers contain a plurality of the group:

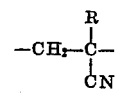

in which the R group may be a halogen atom, a hydrogen atom or an alkyl group. As examples of polymers which may be used, may be mentioned polyacrylonitrile and polymethacrylonitrile. Furthermore, the process is applicable to structures made from the copolymers and interpolymers of acrylonitrile or of methacrylonitrile. Such copolymers or interpolymers may be prepared by polymerizing acrylonitrile or methacrylonitrile with other monomers such as styrene and methyl vinyl ketone. In general, polymers prepared by polymerizing acrylonitrile or methacrylonitrile with any copolymerizable substance having one or more ethylenic linkages may be employed in the process of this invention. Further examples of such copolymerizable monomers are vinyl acetate, vinyl chloride, acrylic and methacrylic acid and their esters and homologues, isobutylene, butadiene, as well as other vinyl and acrylic compounds and other olefinic and diolefinic hydrocarbons. This invention is applicable to any polymer containing a plurality of nitrile groups attached to the polymer chain.

The speed and extent of the reaction of the particular structure with the treating agents of this invention depend upon a number of factors such as the number of nitrile groups contained in the particular polymer from which the structures are prepared. While the number of nitrile groups will vary between wide limits, it is generally preferred, for electrical laminations and films and fabrics, to use acrylonitrile polymers in which at least 85% by weight of the polymer molecule is composed of acrylonitrile units. The amount of acrylonitrile in the polymer may be higher, as for example 100%, and it may be very low, as for example about 5%. Further, the speed of the reaction depends upon the sensitivity of the particular polymer to the carrier employed, the speed increasing with greater sensitivity. For example, if water is the carrier, the reaction proceeds faster with polymers which are water sensitive than it does with polymers which are not so sensitive. This is to be expected since the water soluble treating reagents of this invention employed in aqueous media would penetrate further and come into more intimate contact with a water sensitive structure than with a non-sensitive polymer.

This invention contemplates the use of any thiol or hydrosulfide, that is, any compound containing the monovalent —SH radical. The preferred treating reagent of this invention is ammonium hydrosulfide. Commercial ammonium hydrosulfide may be considered to be a solution of ammonium hydroxide which contains a certain percentage of hydrogen sulfide. Accordingly, any aqueous or other solution containing ammonia and hydrogen sulfide may be used in the process of this invention since it is equivalent to ammonium hydrosulfide. Aqueous or other solutions of ammonium salts may be saturated with hydrogen sulfide and employed in this invention. For example, ammonium chloride may be dissolved in water or ethanol and the resultant solutions may be saturated with hydrogen sulfide. The mixtures so formed may be used effectively in the process of this invention. Further, under certain conditions, other hydrosulfides such as sodium, potassium, calcium or barium hydrosulfide may be used to supply the —SH radical. Other equivalents that may be used in the process described include, as shown in some of the examples above, certain solutions saturated with ammonia gas such as solutions of thiols and dithiols containing sufficient quantities of ammonia. As examples of suitable materials which, when saturated with ammonia or coacting with ammonia, may be used in the process of this invention may be mentioned methanethiol, ethanethiol, 1,2-ethanedithiol, propanethiol, butanedithiol, hexamethylenedithiol, etc. It is also possible to accelerate the reaction by adding to any of the reagent solutions an amount of elementary sulfur, for example as is described in Example IV in Table I above. Generally, the media used must be non-reactive toward the particular polymer and, in general, any non-reactive solvent may be used as a carrier of the ammonium and hydrogen sulfide or its equivalents. Such media include water, ethanol, methanol, propanol, dioxane, etc. It is preferred to use a carrier which is a good solvent for the thiol being used and which penetrates the polymer structure to a degree sufficient to permit more than superficial surface modification.

As is disclosed in copending application of George Moore Rothrock Serial No. 745,632, filed May 2, 1947, similar results are obtained when certain aminethiol combinations are used instead of ammonium hydrosulfide. For example, methyl-, dimethyl- or trimethylamine may be used in combination with hydrogen sulfide or any of the thiols mentioned above. Modified polymers similar to those obtained by using ammonium hydrosulfide are obtained.

The amount of the particular reagents used will depend upon the degree of modification desired and upon the particular polymer being treated. If the amount of agent employed is small, an excessive length of time is required for modification. On the other hand, hydrolysis of nitrile groups may occur when large amounts are employed. Accordingly, considerable care must be exercised to avoid such hydrolysis. Generally, the reaction will occur to give products having improved properties when concentrations between 0.1 molar and 2.0 molar are employed. The preferred range of this invention is between 0.4 molar and 1.0 molar solutions of the reagents. The use of concentrations of the reagents lower than the above specified concentrations is permissible and media having low concentrations of the reagents are useful if only slight modification is desired.

There seems to be a threshold temperature below which the reaction is sluggish, but above which it takes place in a reasonable length of time. Depending upon the concentration of the treating solution, the reaction temperature may vary from 75° C. to 200° C. (under pressure), with the range of 100° C. to 150° C. preferred. At higher temperatures, of course, the reaction proceeds more rapidly. For example, for a given concentration of reagent, results obtained by a one hour treatment at 100° C. can be duplicated by a 10 to 15 minute treatment at 150° C.

Of course, this treatment may be carried out on either yarns, fabrics, films, monofils, molded articles or the like. Also, the material, while being treated, may be in the relaxed state or under tension so that no shrinkage occurs. In general, materials treated under tension will show a reduced elongation and better creep properties than materials treated in the relaxed state. To improve the creep properties further, the chemical treating step may be followed by various heat treatments (under tension or relaxed) as described in several of the examples. Such heat treatments of structures treated by the process of this invention may be carried out in air, in inert atmospheres, or in vacuum for any period of time or at any temperature necessary for a desired result.

The reaction described herein is accompanied by a considerable change in color of the treated material. Acrylonitrile polymer, for instance, changes from a light straw color to a deep orange. If the treatment is followed by a long heat treatment in air, the color changes through a dark maroon and finally to black. Other materials described herein change color in a similar manner although the color range may differ. The reason for the color change in the shaped polymers upon chemical treatment is not known. The improved properties are due to the combined effect of ammonia and the thiol-containing compound. Neither ammonia nor the thiol-containing compound, as for example hydrogen sulfide, can effect any material improvement in the thermal properties of the polymers. The fact that the treated structures are insolubilized suggests that cross-linking occurs in the process of this invention. There is no degradation nor is there any appreciable elimination from the polymer of small molecules, such as ammonia, water or the like, when the treatment is carried out so that hydrolysis does not occur. While the nature of the reactions is not known, it is believed that the treatment of this invention produces polymers which are substantially different from those contained originally in the yarns or fabrics.

Sulfur analyses supply further evidence that new compositions of matter are produced and that cross-linking occurs to an appreciable degree. Depending upon the length of the treatment and concentration of reagents, among other factors, the sulfur content may vary from as low as 0.2% to as high as about 5.0%. These values represent the amount of chemically combined sulfur. The nitrogen content, however, remains substantially constant as is shown in Table III below which also shows the carbon and hydrogen contents of a typical polymer modified by the process of this invention.

*Table III*

| Treatment Time | Analysis in Per Cent | | | |
|---|---|---|---|---|
| | C | H | N | S |
| Control | 68.19 | 5.94 | 26.26 | 0.3 |
| 0.5 Hr | 66.66 | 5.96 | 25.50 | 1.80 |
| 1.0 Hr | 65.00 | 6.21 | 24.75 | 2.71 |

Accordingly, the improvement in the properties of the structures arises from cross-linking reactions which produce new compositions of matter. Considering the small amount of combined sulfur present in the polymer, it is surprising that such marked improvements in thermal stability are obtained.

Surprisingly, the initial form of the fabrics, yarns or structures treated by the process of this invention is retained, except for some shrinkage and, in the case of filaments, a corresponding increase in yarn denier. For example, a yarn composed of eighteen filaments can be separated into its component parts after the most drastic treatments of this invention. This is true even though the structure may be prepared from a low softening polymer (147° C. or lower) and the heating is conducted at temperatures of 150° C. or higher. No coalescing or sticking together of filaments occurs even though temperatures above the softening point of the particular polymer are employed. The structures are not tendered nor do they become brittle, but they possess the flexibility and the pleasant hand of the corresponding untreated materials.

The length of time necessary for the chemical treatment varies inversely with the temperature and concentration. For average concentrations, that is about 0.5 molar, and for high temperatures, that is of about 150° C., the time of treatment may be as short as five or ten minutes. On the other hand, when low reagent concentrations (0.25 molar) and low temperatures (75° C. to 90° C.) are used, comparable results are obtained only after treatments from about two to five hours or more. Normally, shorter treatment times are preferred for reasons of economy. Using short periods of time with average concentrations of the reagents of this invention and high temperatures, useful products may be obtained without degradation of the polymeric materials comprising the structures and without hydrolysis of labile groups such as nitrile or ester groups.

The process of this invention can be carried out by any of the methods known to the art. Batchwise operations may be conducted in which the fabric, yarn or any preformed structure is conveniently immersed in a hot bath containing the reagents. When yarns are used, they can be in skein form, or they can be placed on cones or similar storage means which are then immersed in the treating bath. The process can also be continuous. A convenient manner of treating fabric or yarn is to cause it to pass slowly in a relaxed state on an endless belt arrangement through a heated bath containing the reagents of this invention, or tension may be applied to the structure during passage through the treating bath.

The treated fabrics, yarns or the like of this invention are particularly useful for electrical laminations and insulation or other similar uses in which a high strength fabric, yarn or film which will retain its shape and strength under high loads or high temperatures is needed. Such uses are high temperature filtrations, high speed power and conveyor belts, or similar applications.

This invention provides a satisfactory material for these uses since the strengths of the particular structures at elevated temperatures are greatly improved by the treatment of this invention. For example, a yarn composed of polyacrylonitrile, after being treated according to the process of this invention, has a tenacity of 1.8 grams per denier at 275° C. whereas an untreated polyacrylonitrile yarn has a tenacity of only 0.7 gram per denier at the considerably lower temperature of 150° C. Further, the percentage creep at 100° C., after employing the treatment of this invention is in the vicinity of around only 2% to 4% whereas the per cent creep of a control is of the order of 20%. This improvement in creep properties is accompanied by a substantial improvement in the creep recovery properties as is shown in the tables above.

As an additional advantage, structures treated by the process of this invention may be further improved in thermal properties by heat treating in air, that is by exposing them for extended periods of time to temperatures of about 150° C. Such treatments result in increasing the zero strength temperature up to about 350° C. and also in a decrease in the percentage of creep and an increase in the creep recovery.

The process of this invention results in new compositions of matter which are polymeric materials and which have improved dimensional stability at high temperatures and which retain the excellent electrical properties of the parent polymeric materials. The power factor and dielectric properties remain essentially unchanged. For example, untreated polyacrylonitrile fabric has a power factor of about 0.011 at one million cycles while a similar fabric of the same material treated as described in Example 3 has a power factor of 0.007. Both of the above values are considered excellent with regard to electrical insulating properties.

Any departure from the above description which conforms to the present invention is intended to be included within the scope of the claims.

I claim:

1. A process for insolubilizing polymeric structures prepared from polymers having a plurality of nitrile groups attached to the polymer chain by heating, at a temperature of about 100° C. to about 150° C., said structures in a carrier which is inert to said structures and which contains ammonia and a hydrosulfide in molar concentration between about 0.4 and about 1.0, thereby insolubilizing said structures.

2. A process in accordance with claim 1 in which said polymer is polyacrylonitrile.

3. A process in accordance with claim 1 in which said polymer is polymethacrylonitrile.

4. A process in accordance with claim 1 in which said polymer is a copolymer of styrene and acrylonitrile.

5. A process in accordance with claim 1 in which said heating is carried out from about 10 minutes to about 2 hours.

6. A process for insolubilizing polymeric structures comprising cross-linking structures prepared from a polymer having a plurality of nitrile groups attached to the polymer chain by heating, at a temperature of about 100° C. to about 150° C. for about 10 minutes to about 2 hours, said structures in an aqueous carrier which is inert to said structures and which contains ammonia and a hydrosulfide in molar concentrations between about 0.4 and about 1.0, thereby rendering said structures insoluble in solvents for the unmodified structures.

7. A process in accordance with claim 6 in which said hydrosulfide is ethanedithiol.

8. A process for insolubilizing polymeric structures comprising cross-linking structures prepared from a polymer having a plurality of nitrile groups attached to the polymer chain by heating, at a temperature of about 100° C. to about 150° C. for about 10 minutes to about 2 hours, said structures in an aqueous carrier which is inert to said structures and which contains ammonium hydrosulfide in molar concentrations between about 0.4 and about 1.0, thereby rendering said structures insoluble in solvents for the unmodified structures.

9. A process in accordance with claim 6 in which the insolubilized structures are characterized by improved thermal stability while retaining the dielectric properties of the unmodified structures.

ROBERT LOWRY BROWN.

REFERENCES CITED

The following references are of record in the file of this patent:

UNITED STATES PATENTS

| Number | Name | Date |
|---|---|---|
| 1,984,417 | Mark | Dec. 18, 1934 |
| 2,137,584 | Ott | Nov. 22, 1938 |
| 2,418,942 | Morgan | Apr. 15, 1947 |